US012768526B2

(12) United States Patent
Chorosy

(10) Patent No.: US 12,768,526 B2
(45) Date of Patent: Oct. 20, 2026

(54) LIGHTING DEVICE HAVING A HANDLE AND INDEXING

(71) Applicant: STERIS, Merignac (FR)

(72) Inventor: Damien Chorosy, Bordeaux (FR)

(73) Assignee: STERIS, Merignac (FR)

( * ) Notice: Subject to any disclaimer, the term of this patent is extended or adjusted under 35 U.S.C. 154(b) by 0 days.

(21) Appl. No.: 19/152,117

(22) PCT Filed: Jan. 22, 2024

(86) PCT No.: PCT/EP2024/051433
§ 371 (c)(1),
(2) Date: Jul. 30, 2025

(87) PCT Pub. No.: WO2024/160577
PCT Pub. Date: Aug. 8, 2024

(65) Prior Publication Data
US 2026/0227056 A1 Aug. 6, 2026

(30) Foreign Application Priority Data
Feb. 2, 2023 (EP) .................................... 23154772

(51) Int. Cl.
*F21V 21/40* (2006.01)
*F21V 21/14* (2006.01)

(52) U.S. Cl.
CPC .............. *F21V 21/40* (2013.01); *F21V 21/14* (2013.01)

(58) Field of Classification Search
CPC ...... F21V 21/40; F21V 21/403; F21V 21/406; F21W 2131/20; F21W 2131/202; F21W 2131/205; F21W 2131/208; A61B 2017/0046; A61B 2017/293; A61B 17/725
See application file for complete search history.

(56) References Cited

U.S. PATENT DOCUMENTS 10,451,256 B2 * 10/2019 Changeux ............ F21V 21/403
2016/0302879 A1 10/2016 Markus
2021/0239299 A1 8/2021 Westenfelder, II

FOREIGN PATENT DOCUMENTS

EP 3056164 A1 8/2016
EP 3081854 A1 10/2016
EP 3081857 A1 10/2016

OTHER PUBLICATIONS

The International Search Report and Written Opinion issued in corresponding International PCT Application No. PCT/EP2024/051433; Mailing Date: Apr. 4, 2024.

* cited by examiner

*Primary Examiner* — Robert J May

(74) *Attorney, Agent, or Firm* — Chrisman Gallo Tochtrop LLC

(57) ABSTRACT

A lighting device that includes a body which is provided with at least one lighting module and with a handle which is mounted on the body. The body includes at least one attachment stud and indexing means, the handle has at least one base which is able to pivot about an axis (X) relative to the body between a first angular position, which forms an unlocked position of the base relative to the body, and a second angular position, which forms a locked position of the base on the body, said base having at least one oblong hole which extends circumferentially about the axis (X) and is able to cooperate with the attachment stud.

9 Claims, 5 Drawing Sheets

LIGHTING DEVICE HAVING A HANDLE AND INDEXING

FIELD OF DISCLOSURE

The invention relates to a medical lighting device, in particular for an operating room.

PRIOR ART

Such a lighting device conventionally comprises at least one articulated arm, one end of which is fixed and one opposite movable end of which is equipped with a lighting module.

The lighting module can be moved by a surgeon, so as to direct the light beam toward an area of a patient to be illuminated.

Such a device is known in particular from document EP 3 081 854.

This typically comprises a body housing lighting modules, mounted on at least one articulated arm, and a handle attached to the body. Said handle allows you to manually move the body to any point in space and to orient the body and the lighting modules in all directions. The handle is traditionally fixed by screwing onto the body.

The purpose of the invention is to provide an alternative to such fixing of the handle to the body.

DISCLOSURE STATEMENT

To this end, the present document proposes a lighting device comprising a body equipped with at least one lighting module and a handle mounted on the body, characterized in that the body comprises at least one attachment stud and indexing means, the handle comprising at least one base capable of pivoting about an axis relative to the body between a first angular position forming an unlocked position of the base relative to the body and a second angular position forming a locked position of the base on the body, said base comprising at least one oblong hole extending circumferentially about the axis and capable of cooperating with the attachment stud so as to:

- allow the circumferential movement of the attachment stud along the corresponding oblong hole between the locked and unlocked positions of the base relative to the body,
- allow translation along said axis of the base relative to the body in the unlocked position of the base relative to the body, and
- prevent said translation in the locked position of the base relative to the body,
- the indexing means of the body being able to cooperate with complementary indexing means of the base, so as to:
- allow rotation of the base relative to the body, from the unlocked position to the locked position,
- prevent rotation of the base relative to the body, once the unlocked position has been reached.

The terms axial, radial, and circumferential are defined relative to the axis of rotation of the base.

The stud and the oblong hole thus form bayonet-type locking means, where rotation of the base relative to the body makes it easy to lock the base relative to the body. Such fastening means have a relatively simple structure and allow easy mounting of the base, while ensuring secure fixing of the handle to the body.

The attachment stud can extend parallel to the axis of rotation of the base relative to the body.

The attachment stud may comprise a main part and a free end of larger dimension than the main part, the oblong hole of the base comprises a first angular part of greater dimension than the free end and a second angular part of smaller dimension than the free end, the main part of the stud extending into the first angular part of the oblong hole in the unlocked position, the main part of the stud extending into the second angular part of the oblong hole in the locked position.

Thus, in the unlocked position, the free end or head of the stud can pass through the oblong hole and allow the base to be placed or removed relative to the body, by translation of said base. Furthermore, in the locked position, the head of the stud comes into abutment on the edges of the second angular part of the oblong hole, so as to prevent translational movement, and therefore withdrawal, of the base relative to the body.

The main part of the attachment stud may be cylindrical and have a first diameter.

The free end of the attachment stud may be cylindrical and have a second diameter, greater than the first diameter.

The width of the oblong hole is defined as the dimension of the oblong hole perpendicular to the direction of extension of said oblong hole, i.e., the dimension of the oblong hole in the radial direction.

The width of the first part of the oblong hole may be greater than the second diameter. The width of the second part of the oblong hole may be less than the second diameter and greater than the first diameter.

The body may comprise at least three attachment studs distributed around the axis of rotation of the base, cooperating respectively with three oblong holes in the base.

The number of attachment studs and oblong holes can be equal to three.

The attachment studs and oblong holes may be distributed unevenly around the axis of rotation of the base.

Such a feature allows for a keying function to be ensured, in particular if the base comprises additional elements which must be positioned correctly in relation to the base.

The additional elements may be means of electrical connection, for example.

The indexing means of the body, or respectively the complementary indexing means of the base, may comprise a pusher comprising a part movable between an activated position and a deactivated position, said movable part being subjected to the action of an elastic return element tending to return said movable part of the pusher towards its activated position, the complementary indexing means of the base, or respectively the indexing means of the body, comprising a housing, said movable part of the pusher being able to be housed partly in said housing of the base in the activated position.

The movable part may be an indexing finger.

The movable part may be a ball.

The elastic return element may be a spring, for example a compression spring. The spring may be a coil spring.

The spring and the indexing finger may be housed, at least in part, in a body of the pusher. The pusher may be screwed into the body.

The body and/or the base may be equipped with means for deactivating the indexing means, capable of releasing the base in rotation relative to the body.

When the base is rotated to the locked position, it may be held in rotation by activation of the indexing means.

In order to be able to disassemble the base from the body, it is possible to deactivate the indexing means, then move the base to its unlocked position.

The deactivation means may comprise a push button capable of pushing the movable part of the pusher towards its deactivated position, against the force exerted by the elastic return element.

The push button may be housed in a housing. Said housing may be open opposite the indexing means.

The base may be able to pivot, around the axis and between the two angular positions locked and unlocked, by an angle of between 5 and 25°, for example equal to 15°.

The handle may comprise a removable part, removably fixed to the base by means of locking means.

The removable part can thus be removed to facilitate the replacement and/or sterilization of said handle.

The lighting device may be a medical lighting device. The lighting device may be a surgical lamp, particularly for an operating room.

The term "operating room" also includes cases where the lighting device is adapted to a dental chair or a similar area of activity: examination rooms, emergency rooms, plaster rooms, intensive care units, suture rooms, induction rooms, neonatology, pediatrics, maternity, etc.

The device may comprise a base, for example a movable base equipped with wheels, from which a mast extends, an arm being articulated on the mast, for example at the upper end of the mast. A lighting head or dome comprising the body may be mounted on the free end of the arm. The articulated arm may comprise several elements connected to each other by joints allowing the lighting head to be manually moved to any point in space and to be oriented in all directions.

Alternatively, the articulated arm may be connected to a fixed point on a wall or ceiling, for example, and not to a mast attached to a base.

Multiple lighting modules may be mounted inside the body. At least one lighting module may comprise an optical unit and =an electronic card on which light sources are mounted, namely light-emitting diodes, arranged opposite collimators of the optical unit.

The electronic cards of the modules may be used to manage the switching on of the different light sources.

The device may also comprise control means capable in particular of controlling the switching on of the various modules and may comprise an electronic control card for this purpose. Said electronic control card may be mounted and fixed in the body.

A transparent cover can close the body, covering in particular the lighting modules.

BRIEF DESCRIPTION OF THE FIGURES

Other features and advantages of the present disclosure will become apparent from the following detailed description, with reference to the accompanying drawings in which.

DETAILED DESCRIPTION OF DISCLOSURE

Figure 1:
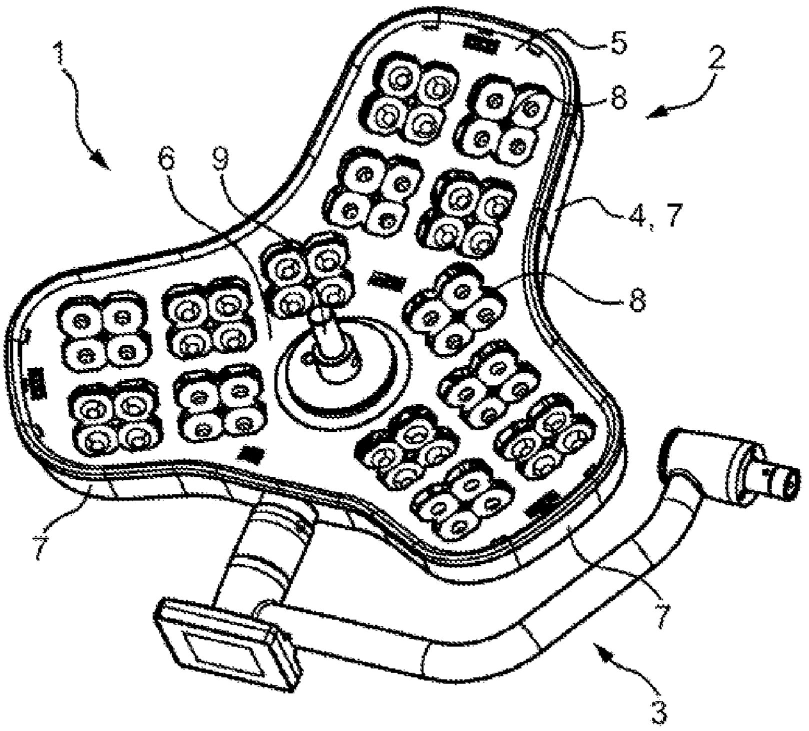
FIG. 1 is a perspective view of a lighting device according to one embodiment of the present document.
Figure 2:
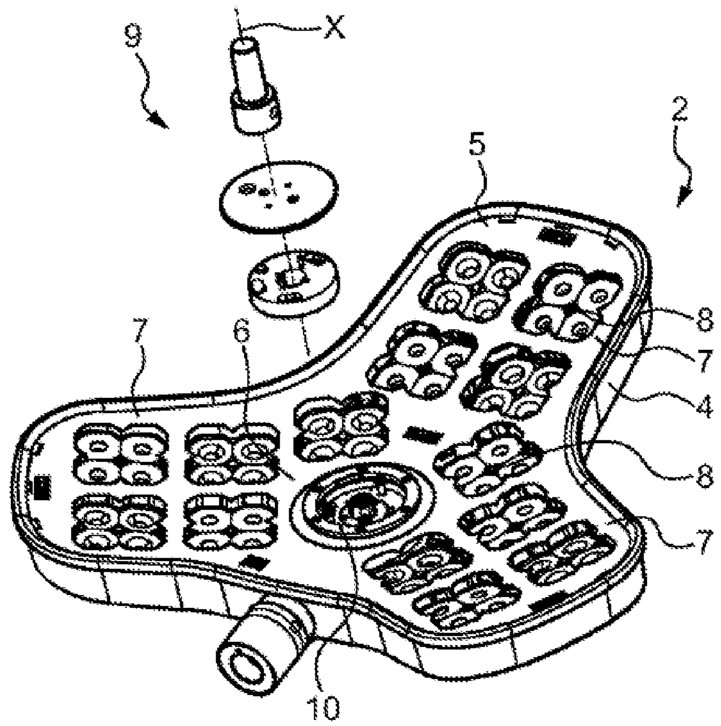
FIG. 2 is an exploded perspective view of part of the device of FIG. 1.
Figure 3:
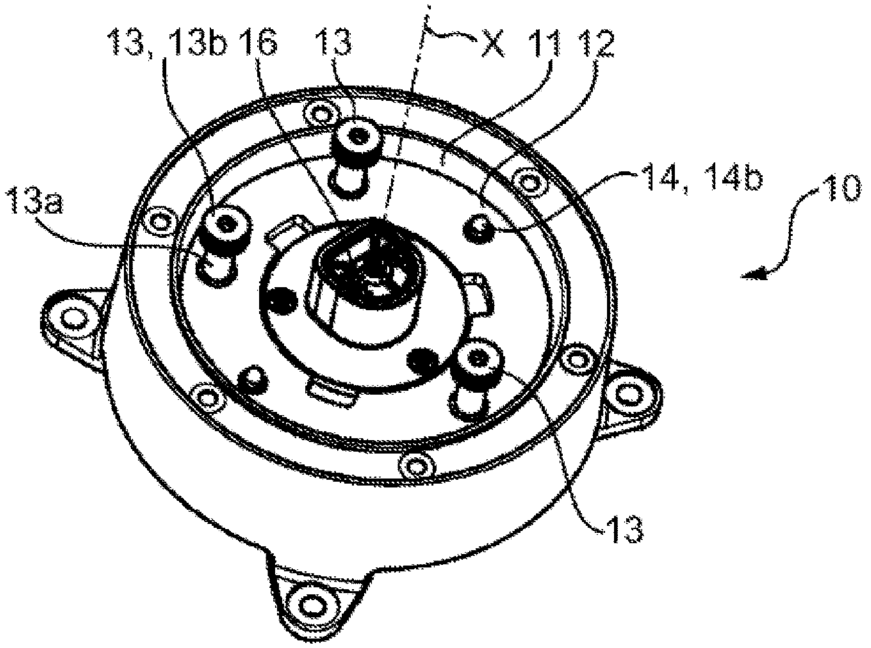
FIG. 3 is a perspective view of a hub of the device body.
Figure 4:
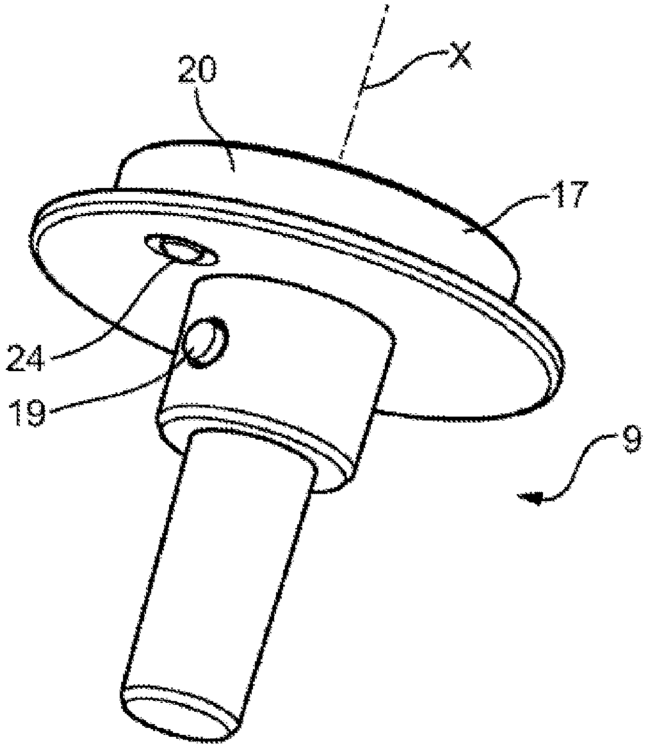
FIG. 4 is a perspective view, from the front, of the handle.
Figure 5:
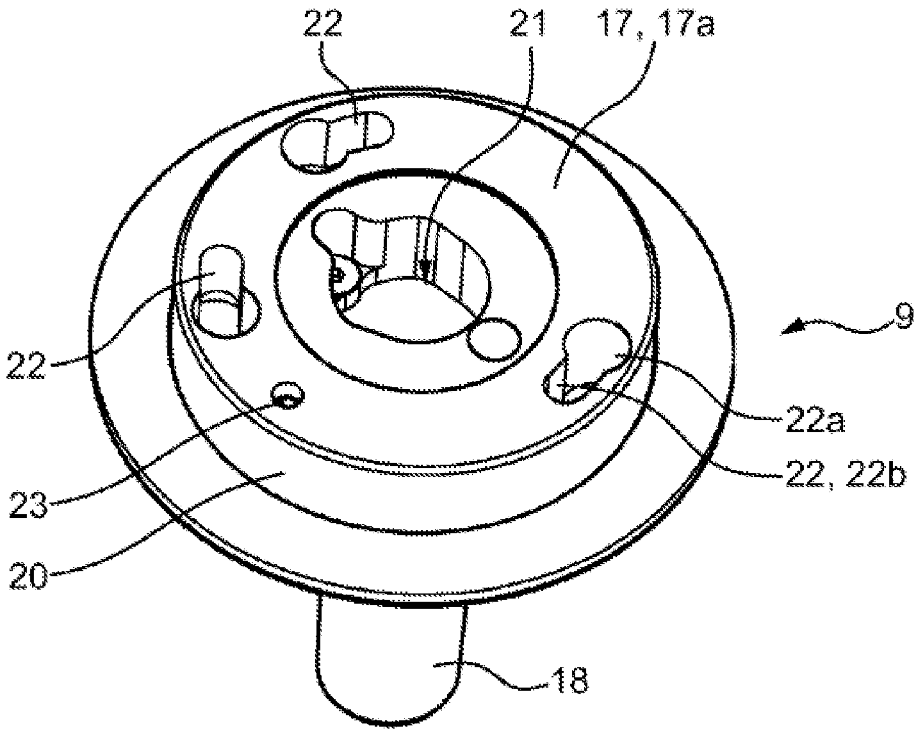
FIG. 5 is a perspective view, from the rear, of the handle.
Figure 6:
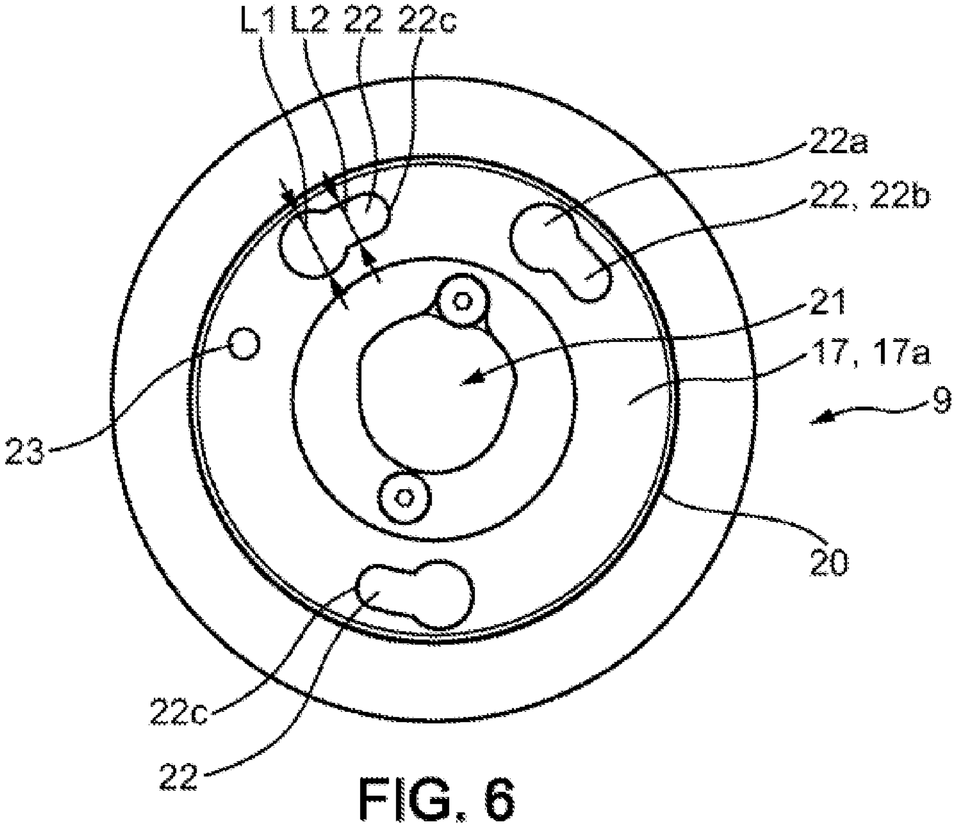
FIG. 6 is a rear view of the handle.
Figure 7:
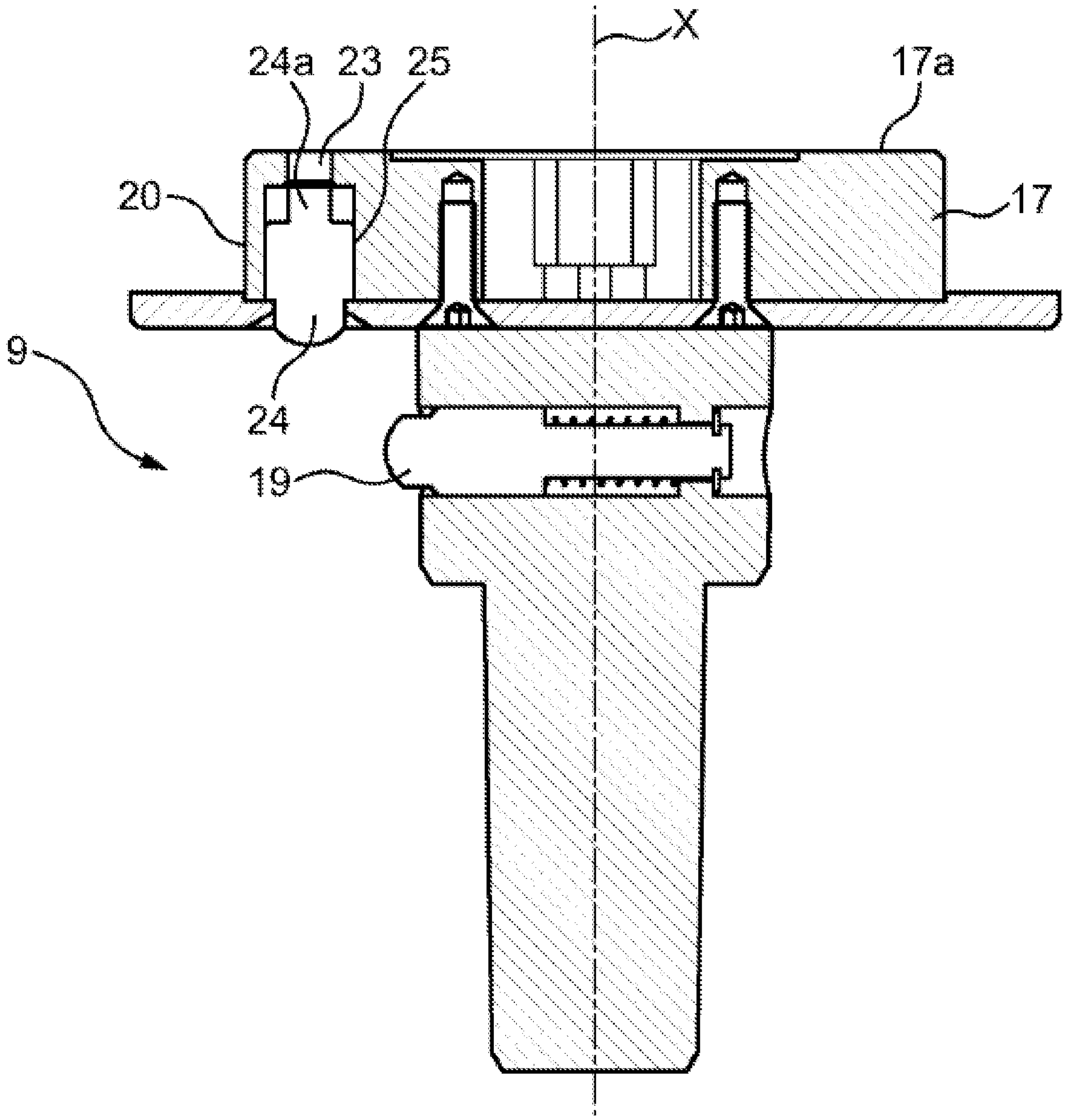
FIG. 7 is an axial sectional view of the handle.
Figure 8:
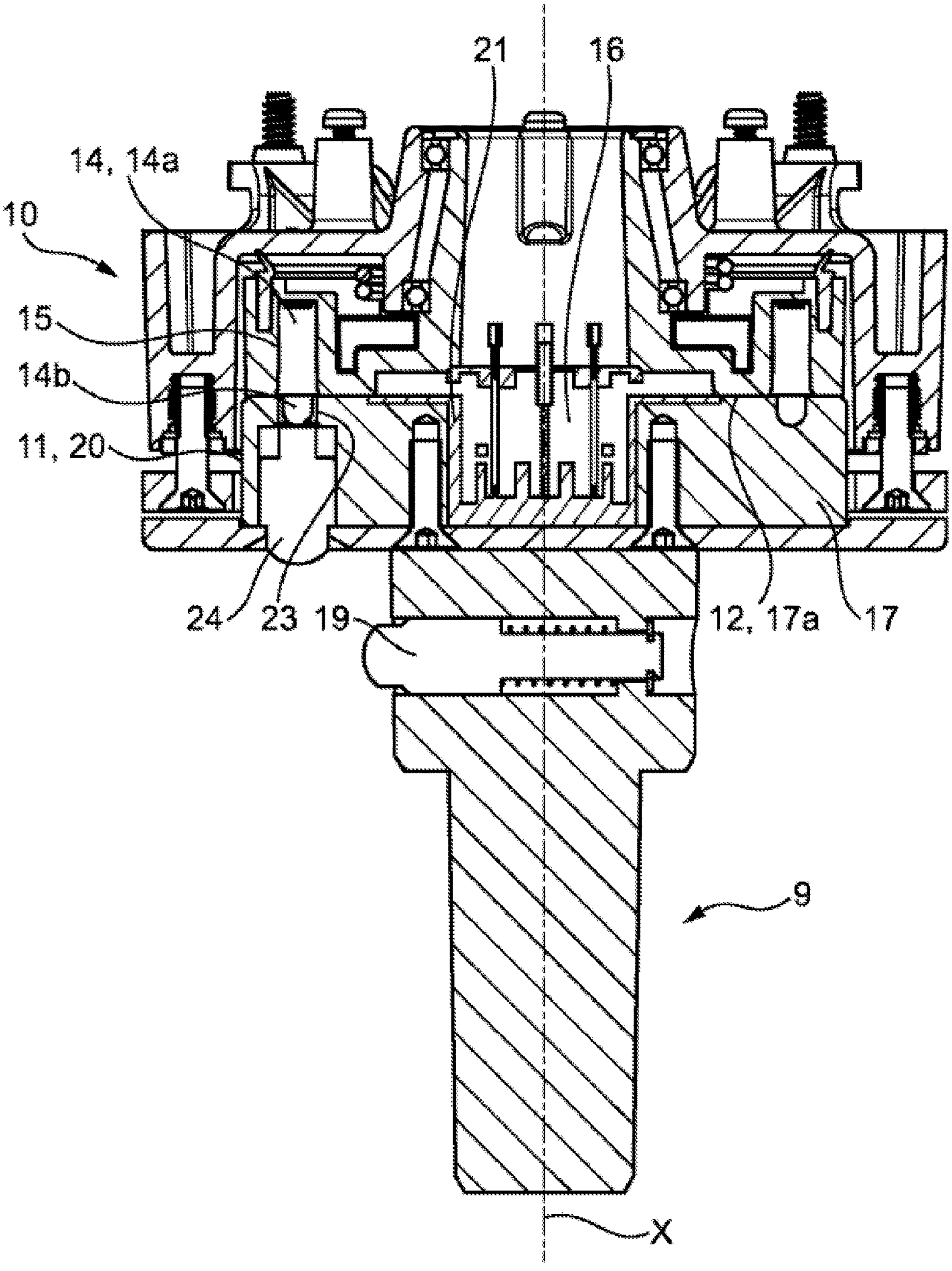
FIG. 8 is an axial sectional view of the handle and hub.

FIGS. 1 to 8 represent a lighting device 1 for an operating room, according to an embodiment of the present document.

This comprises a lighting head or dome 2 and is mounted on the free end of an articulated arm 3.

The lighting head 2 comprises a hollow body 4 whose opening is covered by a transparent protective cover or screen 5.

The body 4 comprises a central part 6 from which three lobes 7 extend. Lighting modules 8 are mounted inside the body 4. Each module 8 comprises an optical unit and an electronic card on which four light sources are mounted, namely light-emitting diodes, arranged opposite collimators formed by the optical unit.

The device 1 also comprises control means capable in particular of controlling the switching on of the different modules.

A handle 9 is mounted on the body 4, in particular on a hub 10 of the body 4.

The hub 10 has, for example, a circular shape with axis X and delimits a cylindrical guide surface 11 and a bottom surface 12. Three attachment studs 13 (FIG. 3) extending parallel to the axis X and are distributed unevenly around the axis X.

Each attachment stud 13 comprises a cylindrical main part 13*a* having a first diameter and a free end or head 13*b*, having a second diameter, greater than the first diameter.

At least one pusher 14 is mounted in the hub 10. The pusher 14 comprises a body 14*a* (FIG. 8) screwed into a tapped hole 15 of the hub 10 and an indexing finger 14*b* housed partly and movably in the body 14*a*. The finger 14*b* is movable between a deactivated position wherein it is entirely housed in the body 14*a* of the pusher 14 and does not protrude beyond the bottom surface 12, and an activated position wherein the finger 14*b* extends partly outside the body 14*a*, protruding relative to the bottom surface 12 of the hub 10. An elastic return spring is housed in the body 14*a* and pushes the finger 14*b* toward its activated position.

The hub 10 may also comprise electrical connection means 16, in the center, which may be used with other specific handles.

The handle 9 comprises a base 17 and a removable part not shown, mounted removably relative to the base 17. A button 19 allows the removable part 18 to be released from the base 17.

The base 17 comprises a cylindrical guide surface 20 of the axis X, capable of cooperating and being guided inside the cylindrical guide surface 11 of the hub 10. The base 17 also comprises a recess 21 capable of housing the electrical connection means 16 of the hub 10.

The base 17 also comprises three oblong holes 22, intended to cooperate with the attachment studs 13.

Each oblong hole 22 extends circumferentially about the axis X, over an angular range of between 5 and 25°.

The width of the oblong hole 22 is defined as the dimension of the oblong hole perpendicular to the direction of extension of said oblong hole, i.e., the dimension of the oblong hole in the radial direction.

Each oblong hole 22 has a first angular portion 22*a* and a second angular portion 22*b*. The width L1 of the first part 22*a* is greater than the width L2 of the second part 22*b*. Furthermore, the width L1 of the first part 22*a* of each oblong hole 22 is greater than the diameter of the head 13*b* of the corresponding attachment stud 13. Furthermore, the width L2 of the second part 22b of each oblong hole 22 is less than the diameter of the head 13b and greater than the diameter of the main part 13a of the corresponding attachment stud 13.

The base 17 further comprises a housing 23 capable of receiving at least part of the finger 14b of the pusher 14.

The base 17 is finally equipped with a deactivation button 24 mounted in a housing 25, said housing 25 opening into the orifice 23 intended to come opposite the finger 14b of the pusher 14 in an angular position for locking the base 17 relative to the hub 10. The button 24 is able to be moved in translation along the housing 25, one end 24a of the button 24 being able to penetrate into the orifice 23 and to come to bear on the finger 14b in the aforementioned locking position.

In order to mount the base 17 of the handle 9 on the hub 10 of the body, the attachment studs 13 are introduced into the first parts 22a of the corresponding oblong holes 22, until the heads 13b of said attachment studs 13 extend axially beyond said oblong holes 22, the main parts 13a of the attachment studs 13 extending axially through the oblong holes 22.

Furthermore, the radial surface 17a called the rear surface of the base 17 bears on the bottom surface 12 of the hub 10, the finger 14b being pushed back toward its deactivated position by pressing on the rear surface 17a of the base 17. Such a force applied to the base 17 by the finger 14b makes it possible to push back the handle 9 and prevent it from remaining held on the hub 10 when it is not locked.

The base 17 is then pivoted so that the attachment studs 13 move along the oblong holes 22 and are located at the level of the second parts 22b of the oblong holes 22. In this position, the main parts 13a bear on the corresponding circumferential ends 22c (FIG. 6) of the oblong holes 22 and the heads 13b of the attachment studs 13 bear axially on the edges of the second parts 22b of the oblong holes 22, preventing the translation of the base 17 relative to the hub 10. Furthermore, the finger 14b of the pusher 14 is pushed back toward its activated position, coming to be housed partly inside the corresponding housing 23 of the base 17.

The finger 14b thus prevents the rotation of the base 17 relative to the hub 10 and, thus, the unlocking of the base 17 relative to the hub 10.

In order to achieve such unlocking, it is necessary to press the deactivation button 24, the latter pushing the finger 14b toward its deactivated position, against the return spring of the pusher 14. Therefore, the base 17 may be pivoted relative to the hub 10 so as to move the studs 13 toward the first part 22a of the oblong holes 22, where the removal of the base 17 by translation relative to the hub 10 is possible.

What is claimed is:

1. A lighting device (1) comprising a body (4) equipped with at least one lighting module and a handle (9) mounted on the body (4), wherein the body (4) comprises at least one attachment stud (13) and indexing means (14, 23), the handle (9) comprising at least one base (17) capable of pivoting about an axis (X) relative to the body (4) between a first angular position forming an unlocked position of the base (17) relative to the body (4) and a second angular position forming a locked position of the base (17) on the body (4), said base (17) comprising at least one oblong hole (22) extending circumferentially about the axis (X) and capable of cooperating with the attachment stud (13) so as to:

allow the circumferential movement of the attachment stud (13) along the corresponding oblong hole (22) between the locked and unlocked positions of the base (17) relative to the body (4), allow translation along said axis (X) of the base (17) relative to the body (4) in the unlocked position of the base (17) relative to the body (4), and prevent said translation in the locked position of the base (17) relative to the body (4), the indexing means (14) of the body (4) being able to cooperate with complementary indexing means (23) of the base (17), so as to:

allow rotation of the base (17) relative to the body (4), from the unlocked position to the locked position, prevent rotation of the base (17) relative to the body (4), in an unlocked position.

2. The device (1) according to claim 1, wherein the attachment stud (13) comprises a main part (13a) and a free end (13b) of larger dimension than the main part (13a), the oblong hole (22) of the base comprises a first angular part (22a) of dimension (L1) greater than the free end (13b) and a second angular part (22b) of dimension (L2) smaller than the free end (13b), the main part (13a) of the stud (13) extending into the first angular part (22a) of the oblong hole (22) in the unlocked position, the main part (13a) of the stud (13) extending into the second angular part (22b) of the oblong hole (22) in the locked position.

3. The device (1) according to claim 1, wherein the body (4) comprises at least three attachment studs (13) distributed about the axis of rotation of the base (17), cooperating respectively with three oblong holes (22) of the base (17).

4. The device (1) according to claim 3, wherein the attachment studs (13) and the oblong holes (22) are distributed unevenly about the axis of rotation (X) of the base (17).

5. The device (1) according to claim 1, wherein the indexing means (14) of the body (4), or respectively the complementary indexing means of the base, may comprise a pusher (14) comprising a movable part (14b) between an activated position and a deactivated position, said movable part (14b) being subjected to the action of an elastic return element tending to return said movable part (14b) of the pusher (14) toward its activated position, the complementary indexing means (23) of the base (17), or respectively the indexing means of the body, comprising a housing (23), said movable part (14b) of the pusher (14) being able to be housed partly in said housing (23) of the base (17) in the activated position.

6. The device (1) according to claim 1, wherein the body (4) and/or the base (17) is equipped with means (24) for deactivating the indexing means (14, 23), capable of releasing the base (17) in rotation relative to the body (4).

7. The device (1) according to claim 6, wherein the deactivation means comprise a push button (24) capable of pushing the movable part (14b) of the pusher (14) towards its deactivated position, against the force exerted by the elastic return element.

8. The device (1) according to claim 1, wherein the base (17) is capable of pivoting, about the axis (X) and between the two angular locked and unlocked positions, by an angle of between 5 and 25°.

9. The device (1) according to claim 1, wherein the handle (9) comprises a removable part, removably fixed on the base (17) by means of locking means (19).

* * * * *